Aug. 21, 1934.  C. H. WILLS  1,971,060
ROTARY VALVE
Filed April 22, 1932   2 Sheets-Sheet 2

INVENTOR.
CHILD HAROLD WILLS
BY
*Symmestvedt & Lechner*
ATTORNEYS

Patented Aug. 21, 1934

1,971,060

UNITED STATES PATENT OFFICE 1,971,060

ROTARY VALVE

Child Harold Wills, Marysville, Mich., assignor, by mesne assignments, to Mary C. Wills, Grosse Pointe Farms, Mich.

Application April 22, 1932, Serial No. 606,812

2 Claims. (Cl. 123—190)

This invention relates to rotary valves and is especially useful in connection with internal explosion engines.

One of the primary objects of the invention is to improve the lubrication of the valve.

More particularly I propose to provide means whereby the valve will be effectively lubricated in service by the lubricating material in the gases.

A further object of the invention is to balance the valve under all conditions of operation and to utilize the balancing means as an instrumentality for securing effective ignition.

I accomplish the foregoing, together with such other objects and advantages as may hereinafter appear, or are incident to the invention, by means of the construction which I have illustrated in the preferred form in the accompanying drawings, wherein—

Fig. 5 is a section taken on the line 5—5 of Fig. 3, and

Fig. 6 is a cross section similar to Fig. 2 showing the valve in a different position.

Figure 1:
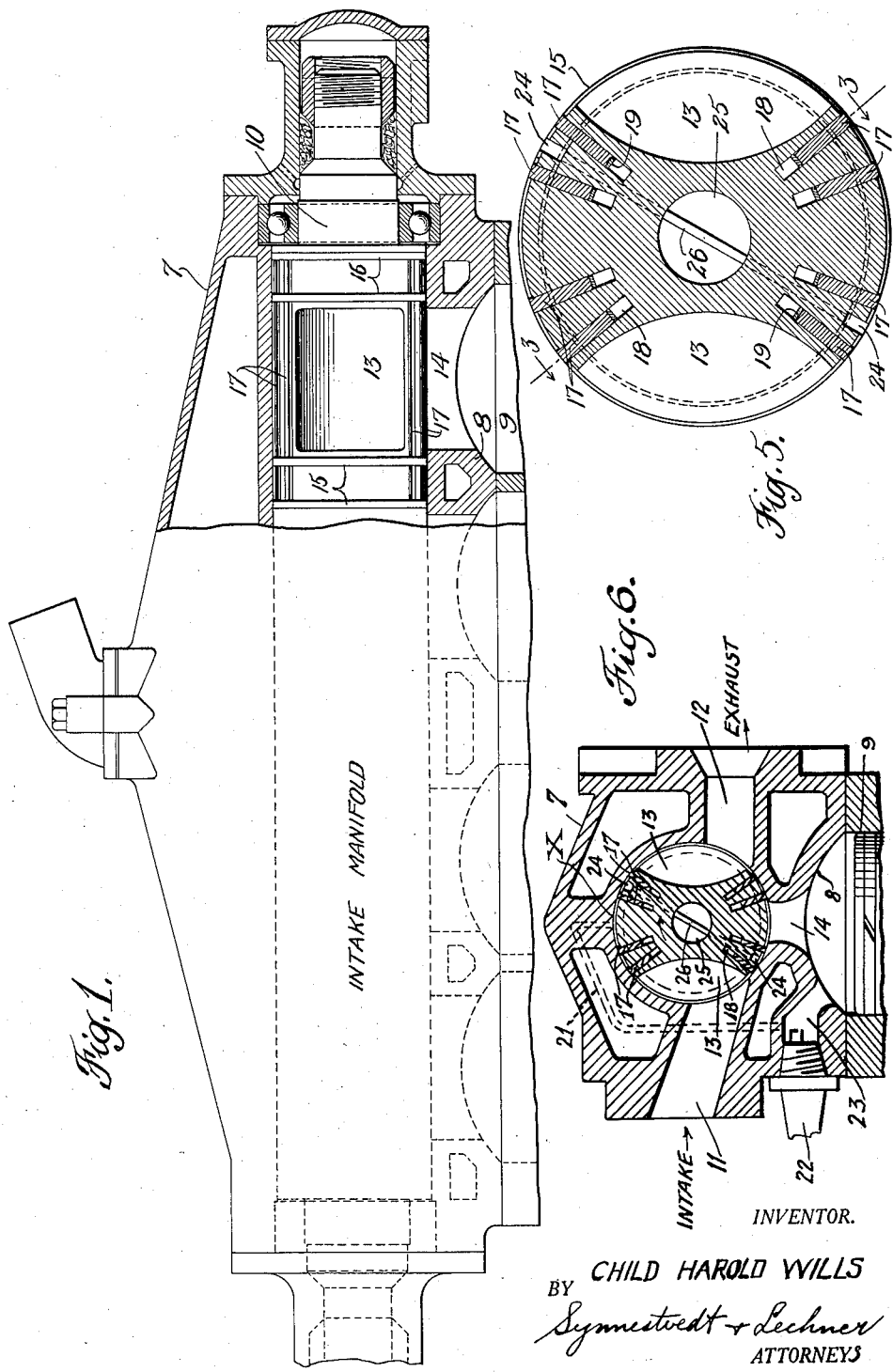
Fig. 1 is a fragmentary side view in partial section to show the rotary valve.

Referring now to Fig. 1, the reference numeral 7 indicates the valve housing, the lower portion 8 of which constitutes the head of the motor. Four cylinders 9 are shown, but it is to be understood that the invention may be applied to a motor having any number of cylinders. The rotor 10 is mounted in the housing by means of bearings and is driven in the customary manner.

Figure 2:
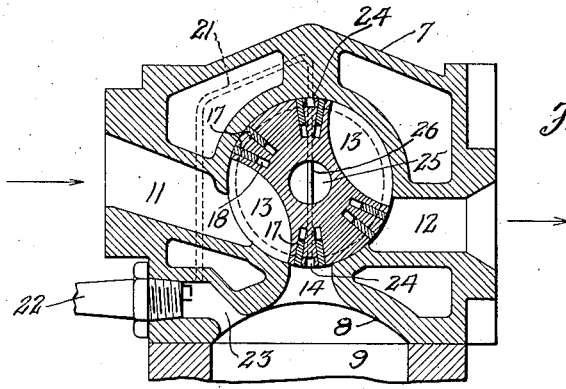
Fig. 2 is a cross section of Fig. 1.
Figure 3:
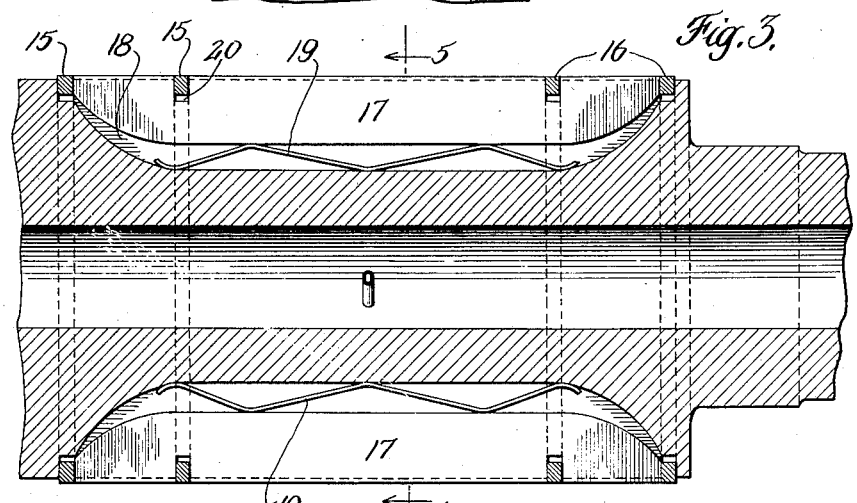
Fig. 3 is an enlarged section through a portion of the valve to more clearly illustrate some of the parts, said section being taken on the line 3—3 of Fig. 5.
Figure 4:
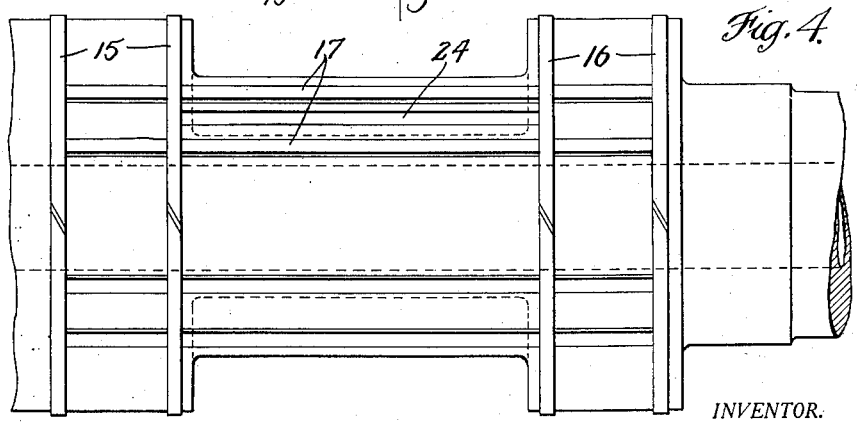
Fig. 4 is a side elevation of Fig. 3.

Referring to Fig. 2, the reference numeral 11 indicates an intake port of which there is one in the housing for each cylinder, and the reference numeral 12 indicates an exhaust port of which similarly there is one for each cylinder. The rotor is provided with pairs of cut-away portions 13, there being one pair for each cylinder. These serve to connect the slot 14 with the intake and with the exhaust ports. There is one such slot for each cylinder.

The rotor has sufficient clearance in the housing to prevent binding under the action of heat and in order to prevent leakage. Each cavity 13 is bounded by annular rings 15 and 16 and by pairs of longitudinal links 17. These links form uninterrupted sealing walls about the cavities, a pair of links 17 being located on each side of each cavity in order to provide an uninterrupted surrounding wall in all positions of the valve. The rotor is provided with slots 18 which receive the links 17, the latter being held outwardly by centrifugal force and by the springs 19. The links 17 are slotted at 20 to receive rings 16.

To balance the valve I provide means for subjecting the top of the valve to the same order of pressure as the bottom of the valve is subjected in operation. To this end I provide a balancing passage 21, there being one such balancing passage for every cylinder. This balancing passage serves to connect the top of the combustion space of the cylinder with the space between the top of the housing and the top of the rotor. If the cylinder is on compression, this compression pressure is applied to the top of the rotor. If the cylinder is on suction, suction pressure is applied to the top of the rotor. Similarly on explosion and on exhaust. Each cylinder has a spark plug 22 which is preferably set in a well 23. The passage 21 opens into such well. In consequence any spent gas that may remain in the well is forced by the incoming charge when under compression, through the passage 21 into the space at the top of the rotor from whence it eventually reaches the exhaust port 12. The well is thus cleared of spent gases and effective ignition is secured.

This will be clear from Fig. 6, in which the valve 10 is shown in the position which it assumes when the piston is at compression approximately ready for explosion of the charge, the intake and exhaust ports 11 and 12 being closed and the direction of rotation being such that the exhaust port 12 will be uncovered after the explosion stroke. It will be seen that any spent gases collected in the well 23 would be forced out, under the compression stroke, through the passage 21 to the top of the rotary valve 10. At the beginning of the compression stroke, gases would be pushed into the slot 24 located in the space between the pair of longitudinal links 17, but as the upward compression stroke continues, the valve also rotates so that toward the end of the compression stroke the spent gases from the well 23 are forced into the chamber provided by the rings and links and indicated at X. In this connection it is to be noted that the space at X has been exaggerated, but nevertheless there is a space because of the valve clearance mentioned hereinbefore. As the valve continues to rotate in the direction of the arrow, these gases are carried around with the valve and first the gases in the slot 24 are exhausted through the exhaust port 12, and then the gases which are carried around in the chamber X.

The rotor is not lubricated in the ordinary sense of the word, but reliance for lubrication is placed upon the lubricating substances from the incoming and the spent charges. To make this more effective I connect opposite faces of the rotor by means of the slots 24 which are preferably located in the space between pairs of the longitudinal links 17, as indicated in Fig. 2. If the rotor is provided with a central cavity 25 for purposes of circulating cooling water therethrough, I connect the slots 24 by a tube 26, open at its ends. It will be understood that this arrangement is employed for each cylinder. The arrangement tends to ensure that sufficient lubricant gets to all surfaces of the housing. The arrangement ensures an adequate supply of lubrication to the space between the upper part of the rotor and the housing, the longitudinal links wiping it around over the surfaces.

I claim:—

1. In combination with a cylinder, a valve housing communicating with the cylinder and having an intake and an exhaust port, a rotary valve adapted to connect the cylinder with said ports respectively, a spark plug well, a spark plug therein, and passage leading from the well to the interior of the housing at a point opposite the point of communication of the housing with the cylinder.

2. In combination with a cylinder, a valve housing communicating with the cylinder and having an intake and an exhaust port, a rotary valve having port cavities adapted to connect the cylinder with said ports respectively, annular rings and longitudinal links forming uninterrupted sealing walls surrounding said port cavities, a spark plug well, a spark plug therein, and a balancing passage one end of which opens into the well and the other to the face of the valve opposite the cylinder.

CHILD HAROLD WILLS.